UNITED STATES PATENT OFFICE.

WILLIAM L. TETER, OF PHILADELPHIA, PENNSYLVANIA.

MANUFACTURE OF PAPER FROM GRAIN-CUTICLES.

SPECIFICATION forming part of Letters Patent No. 295,835, dated March 25, 1884.

Application filed December 1, 1882. (Specimens.)

*To all whom it may concern:*

Be it known that I, WILLIAM L. TETER, a citizen of the United States, and a resident of Philadelphia, Pennsylvania, have invented the Manufacture of Paper from Grain-Cuticles, of which the following is a specification.

My invention consists in utilizing the outer woody skin or cuticle of grain, especially wheat, by removing the same from the kernel in the form of elongated fibrous scales and converting the latter into paper-stock, as described hereinafter.

My invention further consists of paper-stock as a new manufacture made of the pulped outer woody skins or cuticles of grain.

In cleaning grain—wheat, for instance—in the ordinary manner preparatory to grinding, it is usual to subject it to a scouring process, which removes the dirt, smut, and other impurities, and more or less of the outer skin, which, however, is in a broken and comminuted condition, these scourings being discarded as useless. I have found that if these outer woody cuticles be removed from the berries in the form of elongated fibrous scales, they can be pulped and rendered available for paper-stock.

The removal of the cuticles in the desired condition for pulping may be effected by the process described in Patent No. 262,504, August 8, 1882—that is, by first heating the grain, then steaming it to moisten its outer coating or cuticle, after which the latter is removed by brushing and attrition in the manner described in the said patent. I do not desire, however, to restrict myself to any specific mode of treating the grain so as to permit the ready removal of fibrous scales therefrom. These scales may be pulped in the usual manner either by caustic-alkali treatment or by the rag-mill.

I wish it to be understood that I do not desire to claim, broadly, the making of paper from the skins or cuticles of grain irrespective of the condition herein described of the said skins or cuticles; but

I claim as my invention—

The mode herein described of utilizing the outer woody skins or cuticles of grain-berries for paper-stock, the said mode consisting in removing the said cuticles from the berries in the form of fibrous scales, and then pulping the same, as set forth.

In testimony whereof I have signed my name to this specification in the presence of two subscribing witnesses.

WILLIAM L. TETER.

Witnesses:
HARRY DRURY,
HARRY SMITH.